Patented Aug. 13, 1940

2,211,207

UNITED STATES PATENT OFFICE 2,211,207

TREATMENT OF CATALYSTS

Vladimir N. Ipatieff and Louis Schmerling, Chicago, Ill., assignors to Universal Oil Products Company, Chicago, Ill., a corporation of Delaware No Drawing. Application October 31, 1938, Serial No. 238,069

8 Claims. (Cl. 23—233)

This invention relates more particularly to the treatment, for regenerative and recovery purposes, of sludges containing aluminum chloride produced in hydrocarbon reactions and also to the use of the recovered materials as catalysts in reactions among organic compounds, particularly the reaction of polymerization of gaseous olefins and alkylations especially of paraffins and aromatics by gaseous olefins.

In a more specific sense the invention is concerned with a novel process for the recovery from sludges, produced in hydrocarbon reactions involving aluminum chloride of catalytically active solid addition complexes of aluminum chloride with halides of heavy metals which are useful as catalysts in hydrocarbon conversion reactions.

In the case of any particular organic reaction involving decomposition of single compounds or the interaction of two or more compounds, the reaction velocity constants are many times of a low order under moderate conditions of temperature and pressure corresponding to a minimum of secondary or side reactions, these latter resulting in the alternation of the primary desired products. For different reactions catalysts of extremely variable character have been found empirically which accelerate the reactions sufficiently so that laboratory processes can be operated upon a commercial scale.

Very few rules have been evolved which enable the prediction of the catalytic activity of any substance in a given organic reaction or the selection of a particular substance to catalyze a particular reaction. Metals, metal oxides, metal salts, various acids and alkalies and substances of an ordinarily inert character which furnish an adsorbent contacting surface have been tried and in different instances have proven effective. The type of catalyst which is produced by the process of the present invention has essentially the character of a complex metal salt.

In one specific embodiment the present invention comprises a process for producing solid addition complexes of aluminum chloride with halides of heavy metals, consisting in heating under hydrogen pressure a halide of a heavy metal and a sludge produced in hydrocarbon reactions involving aluminum chloride.

The cracking process, which is operated principally with the object of producing gasoline from heavier and less valuable petroleum fractions, incidentally produces considerable yields of fixed gases comprising hydrogen, methane, ethane, propane, and butanes, as well as ethylene, propene and butenes in varying quantities and proportions. In most instances these gases are considered to have merely a fuel value, though attempts are made from time to time to utilize the olefinic and paraffinic constituents for the manufacture of hydrocarbon derivatives on a commercial basis. Treatment of such gaseous materials with metal halide catalysts as aluminum chloride in the presence of hydrogen chloride converts the olefins mainly into polymers thereof under certain conditions, while under other carefully controlled conditions certain of the paraffins, notably isobutane and isopentane, are alkylated by the olefinic constituents with the production of higher boiling useful paraffinic hydrocarbons. After such polymerization or alkylation reactions have continued for some time, the catalyst, originally dry and granular, changes to a pasty or sludge-like mass which no longer retains its catalytic activity.

It is the recovery of catalytically active solids and incidentally hydrocarbons from such sludge-like materials containing aluminum chloride with which the process of the present invention is concerned, this being accomplished by heating the aluminum chloride sludges under hydrogen pressure with a halide of a heavy metal or a mixture of metal halides.

For recovery of a catalytically active complex from sludges containing aluminum chloride pressure equipment is used into which the sludge is placed together with the metal halide the quantity of which may be varied between about one-half and twice the molecular quantity of aluminum chloride in the sludge. Hydrogen is then introduced to approximately 50–100 atmospheres initial pressure and the autoclave is heated at temperatures in the order of 150–200° C. for approximately four hours. During this treatment, organic material in the sludge is displaced and recovered as paraffin hydrocarbons formed by hydrogenation. Metal chlorides which have been found useful for such treatment of aluminum chloride sludges include mercurous, mercuric, cupric, nickelic, cadmium and lead while the chlorides of sodium and ammonium do not function in this capacity. Combinations of the active chlorides may be employed also to displace the organic material from the sludge and produce therefrom valuable hydrocarbons and leave in the autoclave catalytically active, solid addition complexes of aluminum chloride with the metal halides. Each halide of a heavy metal or combination of such halides which may be used alternatively will exert its own specific influence in forming catalysts of different physical properties and activities and will not necessarily be identical with that of other members of the class.

The action of mercuric chloride and hydrogen on aluminum chloride and hydrogen on aluminum chloride sludge gave a yellow powder which was shown to be an addition compound of aluminum chloride with mercurous chloride, the mercuric compound having been reduced. Evidence that the complex involved the mercurous rather than the mercuric salt was obtained by separately heating aluminum chloride with each of these halides. With mercuric chloride, a white powder was obtained; the mercury salt melted and the aluminum chloride sublimed into the cooled portion of a test tube. With mercurous chloride an orange melt formed which turned deep red-orange on further heating. The liquid could be refluxed without the separation of aluminum chloride and on cooling the complex solidified.

The complexes of aluminum chloride with metal halides which may be obtained from aluminum chloride sludges by the process of this invention are useful as catalysts for organic reactions, especially so because they are more mild in their action than aluminum chloride activated by hydrogen chloride. For example, they catalyze alkylation reactions without promoting less desirable polymerizations of the olefins involved. As will be shown more completely in a later example a complex catalytic material, obtained by treating aluminum chloride sludge with mercuric chloride in the presence of hydrogen, catalyzed the alkylation of isobutane by ethylene and produced valuable paraffinic gasoline consisting mainly of hexanes, heptanes, and octanes. This catalyst had the advantage of aluminum chloride in that it caused less formation of undesirable sludge and polymers than did aluminum chloride activated by hydrogen chloride. As formation of sludge ultimately ends the active life of aluminum chloride catalysts, the complex catalyst, which forms the lower layer with less rapidity, accordingly has longer active life.

Further evidence that these complex addition products are more mild in their action was obtained in the polymerization of ethylene. Under conditions suitable for alkylation reactions, ethylene polymerized in the presence of aluminum chloride-mercurous chloride complex at about one-fifth the rate at which it ordinarily polymerizes in the presence of aluminum chloride. Because of their slowness in causing polymerization reactions these complex catalysts may be utilized for the alkylation notably of paraffins and aromatics by olefins practically without the usually encountered troublesome polymerization reactions with the consequent lower yield of final alkylated products.

The following examples are given of the results obtainable by operating under the specific conditions found best for the recovery and subsequent use of catalytically active material from aluminum chloride sludges produced in hydrocarbon reactions involving use of aluminum chloride as catalyst, although it is not intended to limit thereby the scope of the invention in exact correspondence with the data presented.

*Example No. 1.*—An aluminum chloride sludge was used in the catalyst manufacture which had formed during ethylene polymerization. In forming this sludge one hundred parts by weight of anhydrous aluminum chloride was placed in a suitable autoclave which was closed and maintained at room temperature, ethylene being introduced to build up 45 atmospheres pressure. The autoclave was then rotated until the pressure dropped to 30 atmospheres, after which more ethylene was added to 45 atmospheres. This sequence was repeated until a total of 150 parts by weight of ethylene had been charged and the reaction of polymerization indicated by pressure drop, had become slow. On discharging the contents of the autoclave, 73 parts by weight of water-white material was obtained in the form of an upper layer of hydrocarbon oil and 180 parts by weight of sludge, which contained the aluminum chloride together with approximately 80 parts by weight of hydrocarbon material.

According to the process of this invention, 20–37 parts by weight of the aluminum chloride sludge was heated with 10 parts by weight of different metal chloride for four hours at about 175 C. under approximately 100 atmospheres initial hydrogen pressure. This treatment yielded valuable catalytic residues, as indicated in the following table together with paraffins consisting mainly of ethane, propane, butanes and pentanes.

|  | $HgCl_2$ | $HgCl$ | $CuCl_2$ | $NiCl_2$ | $CdCl_2$ | $PbCl_2$ |
|---|---|---|---|---|---|---|
| Salt added, 10 parts to parts by weight of aluminum chloride sludge | 31.7 | 34.6 | 35.6 | 20.8 | 34.8 | 36.7 |
| Products, parts by weight: |  |  |  |  |  |  |
| Residue | 25.2 | 31.9 | 36.1 | 23.0 | 31.1 | 36.5 |
| Noncondensibles (except hydrogen) | 9.7 | 5.7 | 2.3 | 5.1 | 3.9 | 3.2 |
| Condensible at −78° C | 4.6 | 5.3 | 3.6 | 1.0 | 5.3 | 5.7(b) |
| Condensible at 0° C | 0.3 | 0.6 | 2.1 | 0.5 | 0.5 | 0.5 |
| Less | 1.9(a) | 1.7 | 1.5 | 1.2 | 4.1 | 0.8 |
| Index of noncondensibles | 2.2 | 2.3 | 2.9 | 3.4 | 2.9 | 2.8 |
| Color of residue | Yellow | Orange | Black | Black | Orange | Red-brown |
| Consistency of residue | Friable | Waxy | Viscous | Friable | Semisolid | Semisolid |
| Hydrocarbons originally in lower layer, approx. parts by weight | 14.6 | 15.9 | 16.4 | 9.6 | 16.0 | 12.9 |
| Hydrocarbons recovered, percent | 100 | 73 | 49 | 69 | 61 | 73 |

(a) Includes 1.3 parts of hydrogen chloride formed by reductions of mercuric to mercurous chloride.
(b) Consists of butanes and pentanes 67 and 33 percent by weight, respectively.

Temperatures in the order of 150–200° C. and pressures of approximately 50–100 atmospheres are usable for these recoveries with essentially the same results as indicated above, but at 125° C. the reaction is too slow to be practical. In general about two moles of the metal halide is added per mole aluminum chloride contained by the sludge.

Several of the aluminum chloride-metal chloride complexes obtained as described in Example No. 1, were used as catalysts for the alkylation of benzene by cyclohexene. For this purpose 20–22 parts by weight of cyclohexene was added slowly with stirring to a mixture of 2 to 5 parts by weight of the complex catalyst and 39–40 parts by weight of benzene. These reactants were mixed at intervals for about 20 minutes until heat was no longer evolved and then decanted, or filtered from the catalyst. Tetracyclohexylbenzene crystallized from the reaction mixture and was usually readily separated from the heavier catalyst which remained on the bottom of the container. The liquid products were washed, dried and distilled to give the yields of cyclohexylbenzenes indicated in the following table:

| | Complex of AlCl₃ with— | | |
|---|---|---|---|
| | HgCl (a) | CdCl₂ | PbCl₂ |
| Reactants, parts by weight: | | | |
| Benzene | 39.0 | 40.5 | 40.4 |
| Cyclohexene | 21.0 | 22.0 | 22.1 |
| Catalyst | 3.0 | 3.6 | 5.4 |
| Products, parts by weight: | | | |
| Benzene | | 28.0 | |
| C₆H₅.C₆H₁₁ | 5.5 | 8.4 | 3.2 |
| C₆H₂(C₆H₁₁)₄ | 7.3 | 3.0 | |
| Other alkylated products | | 11.9 | 3.3 |
| Catalyst layer | 5.0 | 8.2 | |

(a) From treatment of aluminum chloride sludge with mercuric chloride and hydrogen.

Further, the complex catalyst was found to have the advantage of catalyzing the alkylation reaction without causing polymerization of the cyclohexene to any appreciable extent in contrast with the very strong polymerizing activity of aluminum chloride activated by hydrogen chloride.

*Example No. 2.*—In another case the aluminum chloride-mercurous chloride complex obtained by treatment of the aluminum chloride sludge with mercuric chloride by the method indicated in Example No. 1 was tried as catalyst for the alkylation of isobutane by ethylene. For this test 13 parts by weight of the aluminum chloride-mercurous chloride complex was placed in a rotating autoclave into which was introduced 24 parts by weight of isobutane, 31 parts by weight of ethylene and a small amount of hydrogen chloride. After the reaction mixture was rotated for two hours at 20° C. under pressures in the range of 10–30 atmospheres, an upper layer was obtained, stable to nitrating mixture, which contained 60% by weight of gasoline boiling up to 150° C. and consisting of approximately 18% each of hexanes, heptanes, and octanes. Comparison of these results with those obtained under similar conditions using aluminum chloride activated by hydrogen chloride as catalyst showed that the addition complex is a satisfactory alkylation catalyst. Not only did it give a fair yield of product, but it also caused very little formation of lower layer.

*Example No. 3.*—Addition during one hour, of a solution of 46 parts by weight of n-butyl chloride and 20 parts by weight of benzene, to a mixture of 7 parts by weight of the aluminum chloride-mercurous chloride complex (described in Example No. 1 above) in 19 parts by weight of benzene maintained at 38° C. yielded 32% by weight of monobutyl benzene, 22% of dibutyl benzene and 10% of more highly alkylated products.

The character of the present invention and particularly its practical value are evident from the preceding specification and limited numerical data presented, though neither section is intended to be unduly limiting on its generally broad scope.

We claim as our invention:

1. A process for producing catalytic material which comprises heating under hydrogen pressure a halide of a heavy metal and aluminum chloride sludge resulting from the conversion of hydrocarbons in the presence of aluminum chloride, said heating being under conditions adequate to form an addition compound of the heavy metal halide and aluminum chloride, and recovering the resultant addition complex of aluminum chloride with the heavy metal halide.

2. A process for producing catalytic material from aluminum chloride sludge resulting from the conversion of hydrocarbons in the presence of aluminum chloride, which comprises heating said sludge with a halide of a heavy metal at a temperature of the order of 150–200° C. and under an initial hydrogen pressure of approximately 50–100 atmospheres, and recovering the resultant addition complex of aluminum chloride with the heavy metal halide.

3. The process as defined in claim 1 further characterized in that said halide comprises mercuric chloride.

4. The process as defined in claim 1 further characterized in that said halide comprises cupric chloride.

5. The process as defined in claim 1 further characterized in that said halide comprises nickelic chloride.

6. The process as defined in claim 2 further characterized in that said halide comprises mercuric chloride.

7. The process as defined in claim 2 further characterized in that said halide comprises cupric chloride.

8. The process as defined in claim 2 further characterized in that said halide comprises nickelic chloride.

VLADIMIR N. IPATIEFF.
LOUIS SCHMERLING.